(12) United States Patent
Crawford

(10) Patent No.: US 6,671,128 B2
(45) Date of Patent: Dec. 30, 2003

(54) RECORDING HEAD WITH OPPOSITELY DIRECTED MICROSTRIP WAVEGUIDE CONDUCTORS TO INDUCE A MAGNETIC WRITE FIELD FOR LONGITUDINAL OR PERPENDICULAR MAGNETIC RECORDING

(75) Inventor: Thomas M. Crawford, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 90 days.

(21) Appl. No.: 10/023,670

(22) Filed: Dec. 18, 2001

(65) Prior Publication Data

US 2002/0163761 A1 Nov. 7, 2002

Related U.S. Application Data

(60) Provisional application No. 60/279,583, filed on Mar. 29, 2001.

(51) Int. Cl.[7] .............................................. G11B 5/127
(52) U.S. Cl. .................................................. 360/234.5
(58) Field of Search .................................. 360/317, 318, 360/123, 323, 126, 125, 67, 118, 97.01, 234.5; 29/603.14

(56) References Cited

U.S. PATENT DOCUMENTS

| | | | |
|---|---|---|---|
| 4,618,901 A | 10/1986 | Hatakeyama et al. | 360/125 |
| 4,684,206 A | 8/1987 | Bednorz et al. | 385/129 |
| 4,787,002 A | * 11/1988 | Isozaki | 360/118 |
| 5,057,957 A | 10/1991 | Ito et al. | 360/123 |
| 5,195,005 A | 3/1993 | Mallary et al. | 360/126 |
| 5,311,386 A | 5/1994 | Mallary | 360/126 |
| 5,333,086 A | 7/1994 | Frey et al. | 360/125 |
| 5,359,482 A | * 10/1994 | Juncker | 360/123 |
| 5,375,023 A | 12/1994 | Ju et al. | 360/119 |
| 5,396,391 A | 3/1995 | Tanaka et al. | 360/126 |
| 5,436,779 A | 7/1995 | Valstyn | 360/318 |
| 5,532,631 A | 7/1996 | Ngo et al. | 327/110 |
| 5,815,909 A | 10/1998 | Gray | 29/603.14 |
| 5,874,010 A | 2/1999 | Tao et al. | 216/22 |
| 5,901,021 A | 5/1999 | Hirano et al. | 360/122 |
| 6,016,290 A | 1/2000 | Chen et al. | 369/13.17 |
| 6,064,546 A | * 5/2000 | Takano et al. | 360/97.01 |
| 6,160,688 A | * 12/2000 | Okumura | 360/323 |
| 6,292,329 B1 | * 9/2001 | Sato et al. | 360/126 |
| 6,473,258 B1 | * 10/2002 | Shitara et al. | 360/67 |
| 6,553,649 B1 | * 4/2003 | Santini | 29/603.14 |
| 2001/0027603 A1 | 10/2001 | Komuro et al. | 29/603.14 |
| 2002/0071208 A1 | * 6/2002 | Batra et al. | 360/125 |
| 2003/0039068 A1 | * 2/2003 | Crawford et al. | 360/126 |

FOREIGN PATENT DOCUMENTS

| | | |
|---|---|---|
| JP | 55132514 A | 10/1980 |
| JP | 10011706 A | 1/1998 |

OTHER PUBLICATIONS

J. Jury et al., "Design of a Single–turn Microstrip Write Head for Ultra–high Data Rate Recording", *IEEE Trans. On Magn.*, vol. 35, No. 5, pp. 2547–2549 (Sep. 1999).

K. Ouchi, "Recent Advancements in Perpendicular Magnetic Recording", *IEEE Trans. On Magn.*, vol. 37, No. 4, pp. 1217–1222 (Jul. 2001).

* cited by examiner

*Primary Examiner*—Tianjie Chen
(74) *Attorney, Agent, or Firm*—Benjamin T. Queen, II, Esq.; Pietragallo, Bosick & Gordon

(57) ABSTRACT

A recording head for use with a magnetic storage medium includes a pair of write poles structured and arranged to apply a magnetic write field to the magnetic storage medium and a pair of oppositely directed conductors located adjacent the pair of write poles. The pair of conductors combine to induce the magnetic write field in the pair of write poles. One of the oppositely directed conductors has a positive voltage relative to ground and the other of the conductors has a negative voltage relative to ground, such that the pair of oppositely directed conductors combine to drive the magnetic write field in the same direction. Each of the conductors may be a microstrip waveguide.

17 Claims, 3 Drawing Sheets

RECORDING HEAD WITH OPPOSITELY DIRECTED MICROSTRIP WAVEGUIDE CONDUCTORS TO INDUCE A MAGNETIC WRITE FIELD FOR LONGITUDINAL OR PERPENDICULAR MAGNETIC RECORDING

CROSS REFERENCE TO RELATED APPLICATION

This application claims the benefit of U.S. Provisional Application No. 60/279,583 filed Mar. 29, 2001.

FIELD OF THE INVENTION

The invention relates to recording heads for use with magnetic storage media, and more particularly, relates to such recording heads with oppositely directed conductors for inducing a magnetic write field for longitudinal or perpendicular magnetic recording.

BACKGROUND OF THE INVENTION

Longitudinal and perpendicular recording heads for use with a magnetic storage medium are generally known. Longitudinal recording heads utilize a pair of opposing write poles with their tips in close proximity to each other at the bottom surface of the recording head. The two poles are connected at the top by a yoke, which may be made of a ferromagnetic material similar to that used for the poles. A coil having a plurality of turns is located in close proximity to one of the two opposing poles. When a current is passed through the coil, magnetic flux is induced in the yoke, which produces a magnetic field across a write gap, which separates the two poles. A portion of the magnetic flux across the write gap passes through the magnetic storage medium, thereby causing a change in the magnetic state within the magnetic storage medium where the head field is higher than the medium coercive force. The medium coercive force is chosen high enough so that only the head fields across a narrow gap of a thin film inductive head, flowing with a slider on an air-bearing between the surfaces of the disc and the slider, modify the bits of information on the storage medium.

The bits of information are recorded on the disc along concentric tracks that are separated by guard bands. The width of the track plus that of the guard band in which no information is stored defines the track density. The length of the bit along the track defines the linear density. The total storage capacity is directly proportional to the product of track density and linear density. The recording densities possible with longitudinal recording are believed to be limited to approximately 50 to 100 Gbit/inch$^2$, because at higher recording densities, superparamagnetic effects result in magnetic instabilities within the magnetic storage medium.

Perpendicular recording has been proposed to overcome the recording density limitations of longitudinal recording. Perpendicular recording heads for use with magnetic storage media may include a pair of magnetically coupled poles, including a main write pole having a small bottom surface area and a flux return pole having a large bottom surface area. A coil having a plurality of turns is located adjacent to the main write pole for inducing a magnetic field between that pole and a soft underlayer. The soft underlayer is located below the hard recording layer of the magnetic storage medium and enhances the amplitude of the field produced by the main pole. This in turn allows the use of storage medium with higher coercive force; consequently, more stable bits can be stored in the medium. In the recording process, an electrical current in the coil energizes the main pole, which produces a magnetic field. The image of this field is produced in the soft underlayer to enhance the field strength produced in the magnetic medium. The flux density that diverges from the tip into the soft underlayer returns to the main pole through the return flux pole. The return pole is located sufficiently far apart from the main pole such that the soft material of the return pole does not affect the magnetic flux of the main pole, which is directed vertically into the hard layer and soft underlayer.

Regardless of whether longitudinal or perpendicular recording is employed, the goal of higher recording densities requires higher data rate capabilities. However, recording heads, and specifically, the inductive write head portions thereof, are comprised of magnetic inductors. Such inductors behave as an electrical short for low frequency or DC signals, while they behave as an electrical open for high frequency signals. As a result, inductors become more and more difficult to pass current through as the drive frequency increases. Inductors are classified according to their inductance L, which scales the time change of current into induced electromotive force (EMF). This induced EMF is set up to oppose the flow of magnetic flux through the coil and its magnetic core, and hence reduces the efficiency of flux flow, according to the following formula:

$$V_{EMF} = L \cdot \frac{dI}{dt},$$

where $V_{EMF}$ is the opposing voltage, L is the inductance, I is the driving current, and dt is the change in time. A write head must balance the need for magnetizing field, which traditionally requires large magnetic flux, against the need for efficiency, which is reduced because inductors resist being magnetized according to the above formula (they slow down the circuit response). Increasing the flux to get a larger field has the detrimental side-effect of also increasing L. For a given L, the faster one tries to turn on the current, the larger the induced EMF which acts to cancel the induced field, and hence the less efficient the head is. Therefore, to have a head function at high data rates, where dt is very small, L must also be made correspondingly small to balance dt. However, the head must still produce enough field to write. It is well-known that the majority of the head field comes from the soft magnetic core rather than the field of the electrical coils. However, the self-inductance of a conventional coil scales with the square of the number of turns: i.e. a 6 turn head has 36 times more inductance than a 1 turn head, assuming the core inductance is constant. If the single turn head can drive enough flux through the magnetic core to magnetize it and produce sufficient write field, then a single turn head can decrease dt by 36 times compared with the 6 turn head. This analysis assumes that both heads are in a frequency regime where the L of the 6 turn head is large enough to limit the frequency response of the head. Obviously, if the desired dt is obtainable with small enough EMF that the head is sufficiently efficient, then there is nothing to be gained by reducing the inductance of the head.

There is identified, therefore, a need for an improved recording head for higher recording densities and increased data rates that overcomes limitations, disadvantages, or shortcomings of known recording heads.

SUMMARY OF THE INVENTION

The invention meets the identified need, as well as other needs, as will be more fully understood following a review of this specification and drawings.

In accordance with an aspect of the invention, a recording head for use with a magnetic storage medium comprises a pair of write poles and a pair of oppositely directed conductors located adjacent the pair of write poles. The pair of write poles are structured and arranged to apply a magnetic write field to the magnetic storage medium. The pair of oppositely directed conductors combine to induce the magnetic write field in the pair of write poles. One of the oppositely directed conductors has a positive voltage relative to ground and the other of the oppositely directed conductors has a negative voltage relative to ground. The oppositely directed conductors may be microstrip waveguides. In addition, the pair of write poles may be structured and arranged for either longitudinal or perpendicular recording. Advantageously, the pair of oppositely directed conductors combines to drive the magnetic write field in the same direction.

In accordance with an additional aspect of the invention, a magnetic disc drive storage system comprises a housing, a rotatable magnetic storage medium positioned in the housing, and a recording head mounted in the housing adjacent to the rotatable magnetic storage medium. The recording head comprises a pair of write poles with a connecting yoke therebetween, wherein the pair of write poles are structured and arranged to apply a magnetic write field to the magnetic storage medium. The recording head also includes a pair of oppositely directed conductors located adjacent the pair of write poles so as to combine to induce the magnetic write field in the pair of write poles. One of the oppositely directed conductors has a positive voltage relative to ground and the other of the oppositely directed conductors has a negative voltage relative to ground. Each of the oppositely directed conductors may be a microstrip waveguide. In addition, the pair of write poles may be structured and arranged for performing either longitudinal or perpendicular recording.

In accordance with a further aspect of the invention, a method of using a recording head to apply a magnetic write field to a magnetic storage medium is provided. The method includes positioning a pair of write poles, that are structured and arranged to apply the magnetic write field to the storage medium, adjacent the magnetic storage medium. The method further includes inducing the magnetic write field in the pair of write poles with a pair of oppositely directed conductors located adjacent the pair of write poles. The oppositely directed conductors combine to induce the magnetic write field in the pair of write poles due to one of the oppositely directed conductors having a positive voltage relative to ground and the other of the oppositely directed conductors having a negative voltage relative to ground. The method may further include employing as each of the oppositely directed conductors a microstrip waveguide.

DETAILED DESCRIPTION OF THE INVENTION

Figure 1:
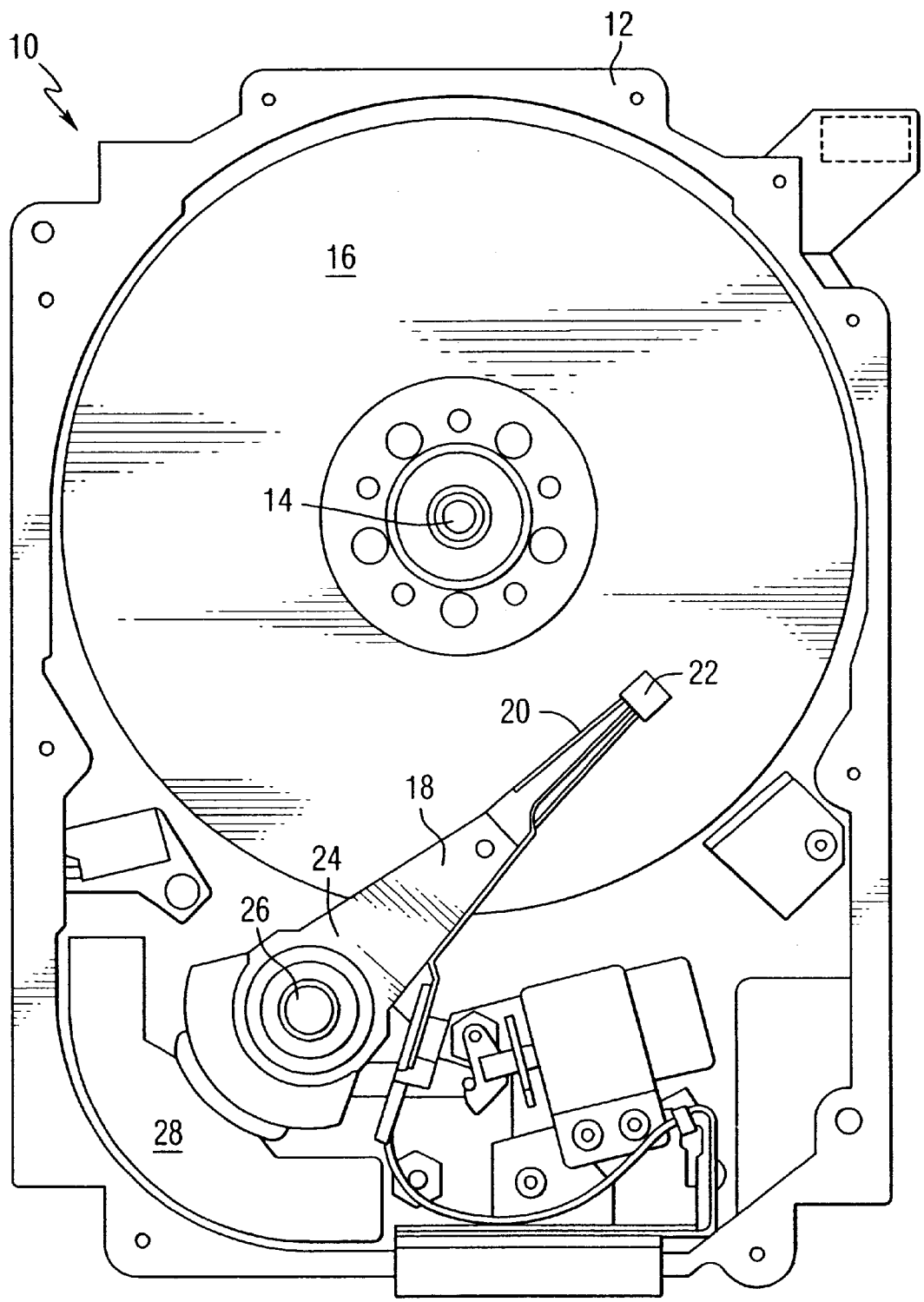
FIG. 1 is a pictorial representation of a disc drive that can use a recording head with oppositely directed conductors constructed in accordance with this invention.

FIG. 1 is a pictorial representation of a disc drive 10 which may employ a recording head constructed in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be constructed for either longitudinal or perpendicular magnetic recording, within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is regulated by a controller, which is not shown in this view and is well known in the art.

Figure 2:
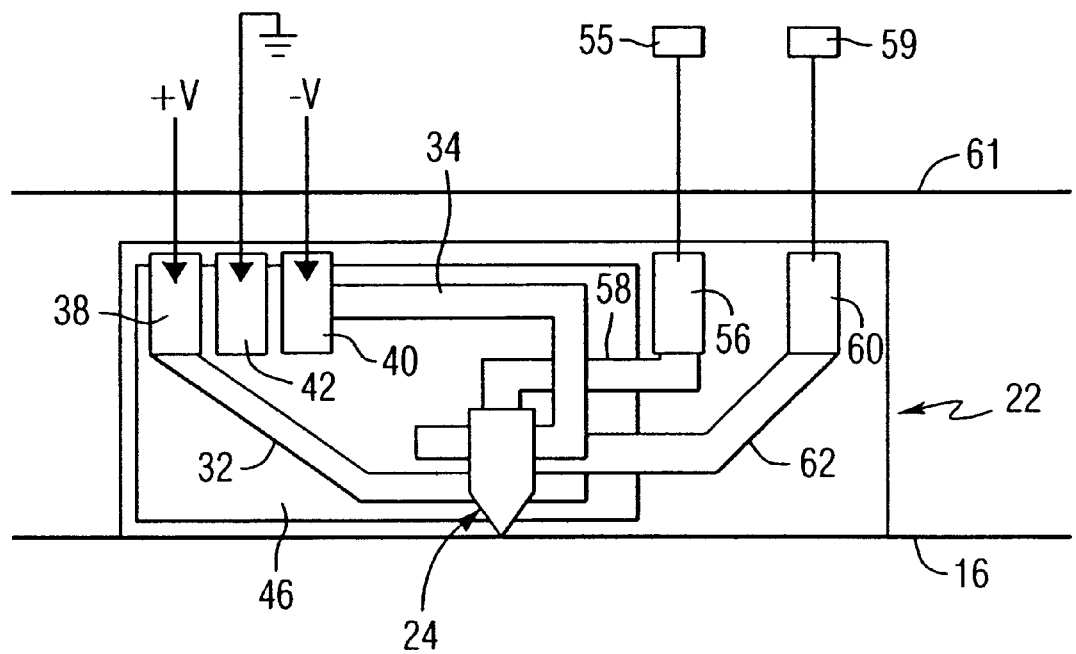
FIG. 2 is a partial schematic view of a recording head constructed in accordance with this invention.
Figure 3:
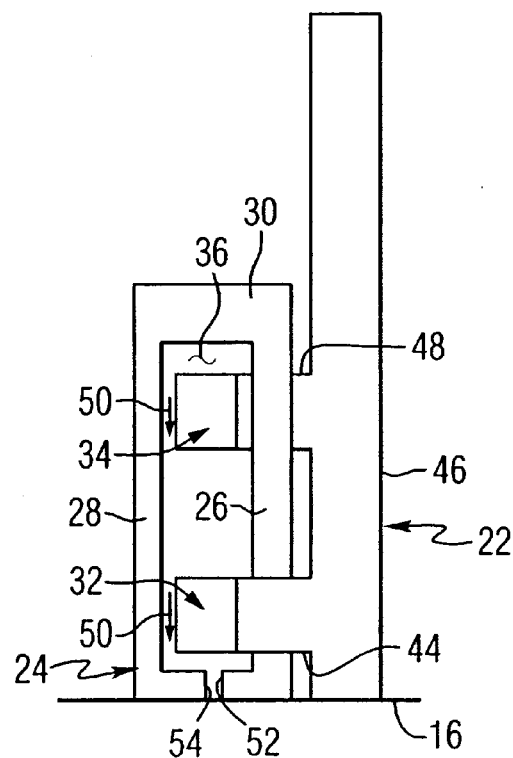
FIG. 3 is a partial wafer cross-section view of the recording head illustrated in FIG. 2.

Referring to FIGS. 2 and 3, there is illustrated an embodiment of a recording head 22 constructed in accordance with this invention. The recording head 22 is shown in schematic format with certain well known components thereof, such as for example layers of insulative materials, not shown for simplicity. The recording head 22 may be used with magnetic storage media, and include a pair of write poles structured and arranged to apply a magnetic write field to the magnetic storage medium 16. The recording head 22, while illustrated as a longitudinal recording device (see specifically FIG. 3), may be used for either longitudinal or perpendicular recording, as will be explained herein. As used herein, longitudinal recording generally refers to orienting the magnetic domains within the magnetic storage medium 16 substantially parallel to the tracks. Perpendicular recording, as used herein, generally refers to orienting the magnetic domains within the magnetic storage medium 16 substantially perpendicular to the storage medium. In addition, recording head, such as recording head 22, as used herein is defined as a head and/or slider capable of performing read and/or write operations.

Still referring to FIGS. 2 and 3, the recording head 22 includes a write portion, generally designated by reference number 24. The write portion 24 of the recording head 22 specifically includes a pair of write poles 26 and 28 with a connecting yoke 30 therebetween. The pair of write poles 26 and 28 and the connecting yoke 30 are structured and arranged to apply a magnetic write field to the magnetic storage medium 16, as is generally known. As described, FIGS. 2 and 3 are shown in schematic format and, although not shown, typically there is provided a gap between the write poles 26 and 28 and the medium 16.

The recording head 22 also includes a pair of oppositely directed conductors, such as microstrip waveguides 32 and 34. It will be appreciated that conductors other than a microstrip waveguide, such as a conventional coil wire may be used in accordance with the invention. The conductors, whether formed as microstrip waveguides 32 and 34 or as a conventional coil wire or other similar type conductor, may be constructed of a material such as, for example, Cu, Au, or like material or combination of materials. For purposes of illustration, the invention will be described herein with reference to the conductors being the microstrip waveguides 32 and 34. An advantage of using microstrip waveguides 32 and 34 is their extendibility to accommodate a large range of frequencies, and particularly higher frequencies for increased data rate capabilities of the recording head 22.

The microstrip waveguides 32 and 34 are located adjacent the pair of write poles 26 and 28 for inducing a magnetic write field in the pair of write poles 26 and 28 for writing to the magnetic storage medium 16. As used herein, "oppositely directed" generally refers to the microstrip waveguides 32 and 34 being situated in generally opposing directions relative to each other and adjacent the pair of write poles 26 and 28 for inducing the magnetic write field in the write poles 26 and 28. For the oppositely directed waveguides, the microstrips 32 and 34 have their shorts to ground on opposite sides of the yoke 30. For the opposite polarities of voltage on the microstrips 32 and 34, the current-induced magnetic field produced by the two conductors will be in the same vector direction in the yoke 30. Therefore, when one microstrip is placed at positive voltage relative to a ground plane 46, and the other microstrip is placed at negative voltage relative to the ground plane 46, the two microstrips 32 and 34 work together to magnetize the pair of write poles 26 and 28. For writing with the opposite direction of field, the voltage polarity is reversed between the two microstrips 32 and 34 and they again work together, but to produce the opposite direction of write field.

As best shown in FIG. 3, the microstrip waveguides 32 and 34 extend through an opening 36 formed between the pair of write poles 26 and 28 and are located adjacent the write poles 26 and 28 and the yoke 30.

The microstrip waveguide 32 is electrically connected to a contact pad 38, which in turn is electrically connected to a positive voltage source, designated as +V. The microstrip waveguide 34 is electrically connected to a contact pad 40 which in turn is electrically connected to a negative voltage source, designated as −V. The recording head 22 also includes a contact pad 42 that is connected to ground. The microstrip waveguide 32 extends from the contact 38 through the opening 36 between the pair of write poles 26 and 28 and the yoke 30. After passing through the opening 36, the microstrip waveguide 32 is connected by a via 44 to the ground plane 46 of the recording head 22. Similarly, the microstrip waveguide 34 extends from the contact 40 through the opening 36 between the write poles 26 and 28 and the yoke 30 in a direction generally opposite, i.e. "oppositely directed", to the microstrip waveguide 32. Once passing through the opening 36, the microstrip waveguide 34 is connected by an additional via 48 to the ground plane 46.

Thus, it will be appreciated that the recording head 22, includes two unbalanced microstrip waveguides 32 and 34, with the microstrip waveguide 32 having a positive voltage relative to ground and the microstrip waveguide 34 having a negative voltage relative to ground. By passing the microstrip waveguides 32 and 34 through the opening 36 between the write poles 26 and 28 in the described oppositely directed manner, the magnetic fields produced by the microstrip waveguides 32 and 34 combine to drive the magnetization or magnetic write field induced in the write poles 26 and 28 in the same direction, as indicated by arrows 50. Advantageously, having the two microstrip waveguides 32 and 34 in the described arrangement doubles the available magnetomotive force to drive the magnetics of the write poles 26 and 28 while minimizing the inductance in each individual conductor to support higher data rate capabilities. By providing for the oppositely directed microstrip waveguides 32 and 34 to have a positive voltage relative to ground and a negative voltage relative to ground, respectively, a full voltage swing may be applied to the write poles 26 and 28 without having magnetic field cancellation.

It will be appreciated that the polarities of the voltage for the microstrip waveguides 32 and 34 may be reversed while still maintaining the same net effect of driving the magnetics of the write poles 26 and 28 in a uniform albeit opposite direction.

The ground plane 46 may be constructed of a material such as, for example, Cu, Au or like material or combination of materials.

As shown in FIG. 3, the pair of write poles 26 and 28 include respective pole tips 52 and 54 which define a write gap therebetween. In order to enhance the driving of the combined magnetic field generated by the microstrip waveguides 32 and 34 while maintaining a decreased level of inductance, the microstrip waveguide 32 may be located proximate to the tips 52 and 54 of the write poles 26 and 28 while the microstrip waveguide 34 may be located proximate to the connecting yoke 30. Specifically, the microstrip waveguide 32 being adjacent to tips 52 and 54 help drive the magnetization in the tips 52 and 54 while the microstrip waveguide 34 helps drive the magnetization through the connecting yoke 30 and between the pair of write poles 26 and 28.

By using two separate-circuit, single-turn coils, in principle, each circuit has the inductance of a single-turn head, while the yoke is now driven by two turns instead of one. This "single-turn" behavior assumes that the two coils are separated enough so that they are inductively decoupled. However, the microstrips are close together, causing some mutual inductance, and they are connected by the highly permeable magnetic core, which increases this inductive coupling between the microstrips. Assuming that this mutual inductance between the two circuits can be made smaller than the self-inductance of a two-turn coil, adding a second circuit with a single turn will result in an overall decrease in inductance compared with the single circuit, two-turn design. Therefore, the proposed invention offers the improved data rate capability of a low-inductance system, while providing the same magnetomotive force as a two turn standard inductive write head, which could be significant for high data rate magnetic recording on high anisotropy media.

The recording head 22 may be constructed using conventional or known thin film processing techniques.

Figure 4:
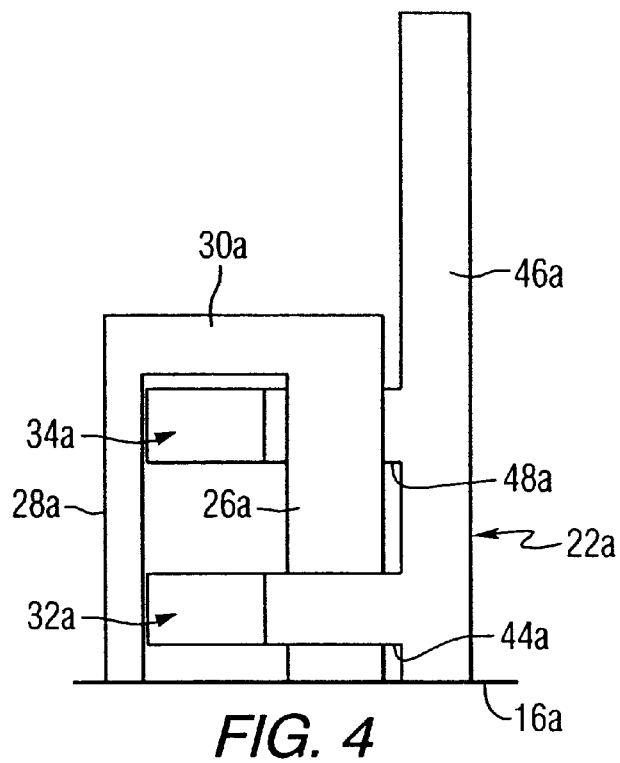
FIG. 4 is a partial wafer cross-section view of an additional embodiment of the invention.

FIG. 4 illustrates a perpendicular recording head 22a, that is otherwise similar to the longitudinal recording head 22 illustrated in FIG. 3, constructed in accordance with this invention. Specifically, the recording head 22a includes a pair of write poles 26a and 28a with a connecting yoke 30a therebetween. The pair of write poles 26a and 28a are structured and arranged to apply a magnetic write field to the magnetic storage medium 16a. The recording head 22a also includes a pair of microstrip waveguides 32a and 34a located adjacent the pair of write poles 26a and 28a which combine to induce the magnetic write field in the pair of write poles 26a and 28a. Specifically, the microstrip waveguide 32a passes between the pair of write poles 26a and 28a and is connected by a via 44a to the ground plane 46a. The microstrip waveguide 34a also passes between the pair of write poles 26a and 28a and is connected by another via 48a to the ground plane 46a. The microstrip waveguides 32a and 34a are oppositely directed to one another and have opposite polarities, e.g., the microstrip waveguide 32a may have a positive voltage relative to ground and the microstrip waveguide 34a may have a negative voltage relatively to ground.

Figure 5:
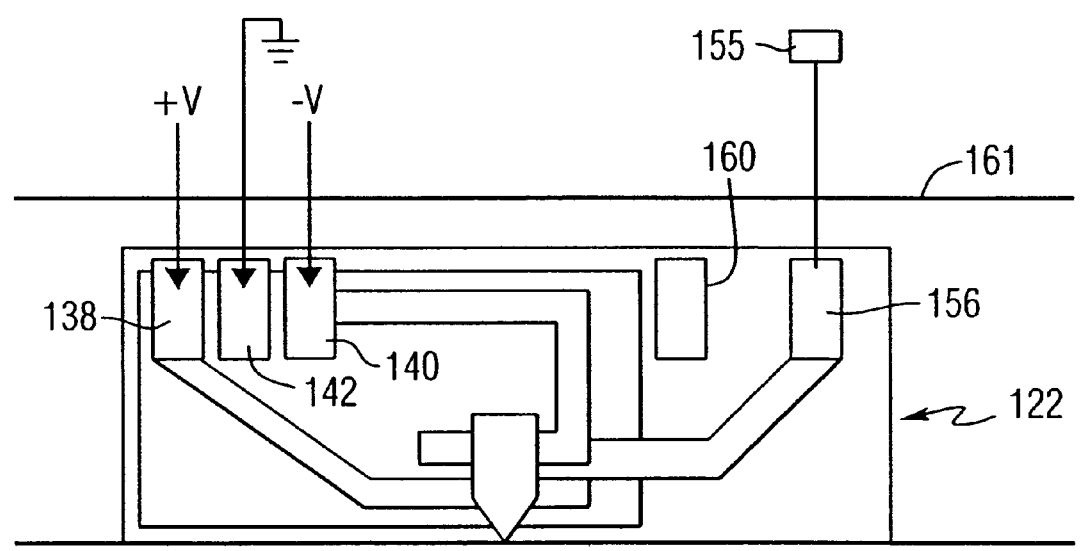
FIG. 5 is a partial schematic view of an additional recording head embodiment of the invention.

In accordance with an additional aspect of the invention, FIG. 2 illustrates the recording head 22 with a five flex on suspension 61 (FOS) wire arrangement and FIG. 5 illustrates a recording head 122 with a four FOS 161 wire arrangement. Specifically in FIG. 2, the recording head 22 may include a reader portion having a reader input 55 and an input contact 56 connected to a microstrip 58 and a reader return 59 and a return contact 60 connected to a microstrip 62 for performing a read operation, as is generally known. For the recording head 22 having the contacts 38, 40 and 42 for the write portion of the recording head and the contacts 56 and 60 for the read portion of the read head, the five FOS 61 wire arrangement is needed. The five FOS 61 wire connection facilitates the contacts 38 and 40 having opposite voltage sources and the ground plane connected to the contact 42 in order to short the microstrip waveguides 32 and 34 that are respectively connected to the contacts 38 and 40. However, FIG. 5 illustrates an additional embodiment of the invention where recording head 122 includes contacts 138, 140 and 142 for the write portion of the recording head 122 and input contact 156 (connected to reader input 155) and return contact 160 for the read portion of the recording head 122. In this arrangement, the return contact 160 may be connected to the ground plane as its return line, which therefore, requires only a four FOS 161 wire arrangement.

In operation of the recording head 22 in accordance with the invention, the pair of write poles 26 and 28 of the recording head 22 are positioned adjacent to the magnetic storage medium 16 for carrying out a write operation. As described, the write poles 26 and 28 may be configured for longitudinal recording (FIG. 3) or the pair of write poles 26a and 28a may be configured for perpendicular recording (FIG. 4) in accordance with the invention. Whether perpendicular or longitudinal recording is being performed, the pair of oppositely directed conductors, specifically microstrip waveguides 32 and 34, are located adjacent the pair of write poles for inducing the magnetic write field therein. The pair of microstrip waveguides 32 and 34 advantageously combine to induce the magnetic write field in the pair of write poles 26 and 28 while minimizing the overall inductance to allow greater response time and higher frequency to support higher data rate capabilities of the recording head 22. This is achieved by one of the microstrip waveguides, such as microstrip waveguide 32, having a positive voltage relative to ground and the other microstrip waveguide, such as microstrip waveguide 34, having a negative voltage relative to ground. By positioning the microstrip waveguides 32 and 34 in an oppositely directed manner and having opposite voltages relative to ground, the microstrip waveguides 32 and 34 combine to drive the magnetic write field in the same direction. By reversing the polarities of the microstrip waveguides 32 and 34, as desired, a write operation may be performed on the magnetic storage medium 16.

Whereas particular embodiments of the invention have been described herein for the purpose of illustrating the invention and not for purpose of limiting the same, it will be appreciated by those of ordinary skill in the art that numerous variations of the details, materials, and arrangements of parts may be made within the principle and scope of the invention without departing from the invention as described herein and in the appended claims.

What is claimed is:

1. A recording head for use with a magnetic storage medium, comprising:
    a pair of write poles with a connecting yoke therebetween, said pair of write poles structured and arranged to apply a magnetic write field to the magnetic storage medium; and
    a pair of oppositely directed microstrip waveguide conductors located adjacent said pair of write poles which combine to induce said magnetic write field in said pair of write poles, one of said oppositely directed microstrip waveguide conductors having a positive voltage relative to ground and the other of said oppositely directed microstrip waveguide conductors having a negative voltage relative to ground.

2. The recording head of claim 1, wherein each of said oppositely directed microstrip waveguide conductors is constructed of a material selected from the group consisting of Cu and Au.

3. The recording head of claim 1, wherein said pair of write poles are structured and arranged for longitudinal recording.

4. The recording head of claim 1, wherein said pair of write poles are structured and arranged for perpendicular recording.

5. The recording head of claim 1, wherein said pair of oppositely directed microstrip waveguide conductors is located between said pair of write poles.

6. The recording head of claim 1, wherein said pair of oppositely directed microstrip waveguide conductors extend through an opening formed between said pair of write poles.

7. The recording head of claim 1, wherein each of said oppositely directed microstrip waveguide conductors are connected to a ground plane by a pair of respective vias.

8. The recording head of claim 1, wherein said pair of oppositely directed microstrip waveguide conductors combine to drive said magnetic write field in the same direction.

9. The recording head of claim 1, wherein each of said write poles have a tip with a write gap defined between said tips, one of said oppositely directed microstrip waveguide conductors located proximate to said tips and the other of said oppositely directed microstrip waveguide conductors located proximate to said connecting yoke.

10. A magnetic disc drive storage system, comprising:
    a housing;
    a rotatable magnetic storage medium positioned in said housing; and
    a recording head mounted in said housing adjacent to said rotatable magnetic storage medium, said recording head comprising:
        a pair of write poles with a connecting yoke therebetween, said pair of write poles structured and arranged to apply a magnetic write field to the magnetic storage medium; and
        a pair of oppositely directed microstrip waveguide conductors located adjacent said pair of write poles which combine to induce said magnetic write field in said pair of write poles, one of said oppositely directed microstrip waveguide conductors having a positive voltage relative to ground and the other of said oppositely directed microstrip waveguide conductors having a negative voltage relative to ground.

11. The recording head of claim 10, wherein said pair of write poles are structured and arranged for longitudinal recording.

12. The recording head of claim 10, wherein said pair of write poles are structured and arranged for perpendicular recording.

13. The recording head of claim 10, wherein each of said oppositely directed microstrip waveguide conductors are connected to a ground plane by a pair of respective vias.

14. The recording head of claim 10, wherein said pair of oppositely directed microstrip waveguide conductors combine to drive said magnetic write field in the same direction.

15. The recording head of claim 10, wherein each of said write poles have a tip with a write gap defined between said tips, one of said oppositely directed microstrip waveguide conductors located proximate to said tips and the other of said oppositely directed microstrip waveguide conductors located proximate to said connecting yoke.

16. A method of using a recording head to apply a magnetic write field to a magnetic storage medium, comprising:

positioning a pair of write poles, that are structured and arranged to apply the magnetic write field to the magnetic storage medium, adjacent to the magnetic storage medium; and inducing the magnetic write field in the pair of write poles with a pair of oppositely directed microstrip waveguide conductors located adjacent the pair of write poles which combine to induce the magnetic write field in the pair or write poles, one of the oppositely directed microstrip waveguide conductors having a positive voltage relative to ground and the other of the oppositely directed microstrip waveguide conductors having a negative voltage relative to ground, wherein the oppositely directed microstrip waveguide conductors combine to drive the magnetic write field in the same direction.

17. The method of claim 16, further including connecting each of the oppositely directed microstrip waveguide conductors to a ground plane by a pair of respective vias.

\* \* \* \* \*